(12) United States Patent
Haynes et al.

(10) Patent No.: US 11,174,878 B2
(45) Date of Patent: Nov. 16, 2021

(54) ASPIRATOR SYSTEM

(71) Applicant: Goodrich Corporation, Charlotte, NC (US)

(72) Inventors: Timothy C Haynes, Prescott Valley, AZ (US); Daniel Bahena, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 854 days.

(21) Appl. No.: 15/405,797

(22) Filed: Jan. 13, 2017

(65) Prior Publication Data

US 2018/0202466 A1 Jul. 19, 2018

(51) Int. Cl.
| | |
|---|---|
| *F04F 5/14* | (2006.01) |
| *F04F 5/46* | (2006.01) |
| *B64D 25/08* | (2006.01) |
| *B64D 25/14* | (2006.01) |

(52) U.S. Cl.
CPC ............... *F04F 5/14* (2013.01); *B64D 25/08* (2013.01); *B64D 25/14* (2013.01); *F04F 5/461* (2013.01); *F04F 5/463* (2013.01)

(58) Field of Classification Search
CPC ........ B64D 25/08; B64D 25/14; B64D 25/18; F04F 5/14; F04F 5/461; F04F 5/20; F04F 5/16; B05B 1/005

See application file for complete search history.

(56) References Cited

U.S. PATENT DOCUMENTS

| 3,370,784 A | | 2/1968 | Day | |
|---|---|---|---|---|
| 3,460,746 A | * | 8/1969 | Forsythe | E04H 15/20 137/223 |
| 4,566,862 A | * | 1/1986 | Halavais | F04F 5/48 417/174 |
| 6,071,084 A | | 6/2000 | Wass | |
| 9,863,442 B2 | * | 1/2018 | Ruegsegger | F04F 5/48 |
| 10,233,666 B2 | * | 3/2019 | Haynes | B64D 25/18 |
| 2010/0258677 A1 | | 10/2010 | O'Donnell | |
| 2010/0266424 A1 | * | 10/2010 | Renz | F04F 5/463 417/191 |
| 2017/0016459 A1 | * | 1/2017 | Ruegsegger | F04F 5/48 |
| 2018/0087537 A1 | * | 3/2018 | Ruegsegger | F04F 5/48 |
| 2018/0171657 A1 | * | 6/2018 | Haynes | E04H 15/44 |
| 2019/0091704 A1 | * | 3/2019 | McEwen | B05B 1/005 |

FOREIGN PATENT DOCUMENTS

| EP | 3118117 | 1/2017 | |
|---|---|---|---|
| WO | 8302981 | 9/1983 | |
| WO | WO-8302981 A1 | * 9/1983 | ............... F04F 5/16 |

OTHER PUBLICATIONS

European Patent Office, European Search Report dated May 16, 2018 in Application No. 18151333.4-1010.
European Patent Office, European Search Report dated Feb. 28, 2019 in Application No. 18151333.4.

* cited by examiner

*Primary Examiner* — Philip J Bonzell
(74) *Attorney, Agent, or Firm* — Snell & Wilmer L.L.P.

(57) ABSTRACT

An aspirator may comprise an aspirator body defining an air channel. An aspirator barrel may have a first aspirator barrel segment coupled to the aspirator body and may have a second aspirator barrel segment. The second aspirator barrel segment configured to fit at least partially within the first aspirator barrel segment when the aspirator barrel is in a stowed state and configured to interlock with the first aspirator barrel segment in an extended position when the aspirator barrel is in a deployed state.

20 Claims, 5 Drawing Sheets

ASPIRATOR SYSTEM

FIELD

The present disclosure is directed to evacuation systems for use in aircraft and, more particularly, to aspirators for inflating evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and an aspirator. The aspirator, working with the charged gas cylinder, combines gas from the atmosphere and the fluid to provide gas for inflating the emergency evacuation devices. Aspirators are typically stored in a limited packing space with the evacuation slide within a small space in the aircraft.

SUMMARY

An aspirator assembly for an inflatable device is described herein, in accordance with various embodiments. An aspirator may comprise an aspirator body having a longitudinal axis. An aspirator barrel may have a first barrel segment coupled to the aspirator body and may have a second barrel segment. The second barrel segment may be configured to fit at least partially within the first barrel segment when the aspirator barrel is in a stowed state and may be configured to interlock with the first aspirator barrel segment in an extended position when the aspirator barrel is in a deployed state.

In various embodiments, a cap may be coupled to a distal end of the aspirator barrel. The aspirator barrel may be configured to extend in response to a pressure increase within the aspirator barrel. The cap may include a burst disk configured to rupture in response to the pressure within the aspirator barrel reaching a predetermined pressure. The predetermined pressure may be selected such that the aspirator barrel is in a fully extended position in response to the pressure within the aspirator barrel being the predetermined pressure. The aspirator barrel may have a tapered shape. A liner may be coupled to the aspirator to form a seal between the first aspirator barrel segment and the second aspirator barrel segment.

An evacuation system for use with an aircraft is also provided. The evacuation system may comprise an inflatable evacuation device configured to be inflated by a compressed fluid source. An aspirator may be coupled to the compressed fluid source and to the inflatable evacuation device. The aspirator may have an aspirator barrel having a first aspirator barrel segment and a second aspirator barrel segment. The second aspirator barrel segment may be configured to fit at least partially within the first aspirator barrel segment when the aspirator barrel is in a stowed state.

In various embodiments, a cap may be coupled to a distal end of the aspirator barrel. The aspirator barrel may be configured to extend in response to a pressure increase within the aspirator barrel. The distal end of the aspirator barrel may extend into the inflatable evacuation device when the aspirator barrel is in a deployed state. The cap may be configured to release in response to a pressure within the aspirator barrel reaching a predetermined pressure. The aspirator barrel may direct fluid into the inflatable evacuation device. A third aspirator barrel segment may be configured to fit at least partially within the second aspirator barrel segment when the aspirator barrel is in the stowed state. The second aspirator barrel segment may be configured to interlock with the first aspirator barrel segment in a telescoped position when the aspirator barrel is in a deployed state. A diameter of the second aspirator barrel segment may be less than a diameter of the first aspirator barrel segment.

An aircraft having an evacuation system is also provided. The aircraft may comprise an inflatable evacuation device configured to pack within the aircraft. An aspirator may be configured to be packed with the inflatable evacuation device within the aircraft. The aspirator may have an aspirator barrel comprising a first aspirator barrel segment in a telescoping arrangement with a second aspirator barrel segment.

In various embodiments, a cap may be coupled to a distal end of the aspirator barrel. The aspirator barrel may be configured to extend in response to a pressure increase within the aspirator barrel. The cap may be configured to release in response to a pressure within the aspirator barrel reaching a predetermined pressure. The aspirator barrel may direct fluid into the inflatable evacuation device. The aspirator barrel may be configured to be stored in a collapsed position, the second aspirator barrel segment configured to fit at least partially within the first aspirator barrel segment when the aspirator barrel is in the collapsed position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

The present disclosure relates to aspirators for inflatable devices. In various embodiments, the aspirator is telescoping and is configured to move from a collapsed state and an extended state. The aspirator includes a barrel having telescoping segments and is collapsible and extendable. The telescoping portions of the aspirator further include self-interlocking features. The telescoping configuration of the aspirator allows the aspirator to occupy less storage space prior to deployment of the inflatable device, when the aspirator is in a collapsed position and stowed.

Figure 1:
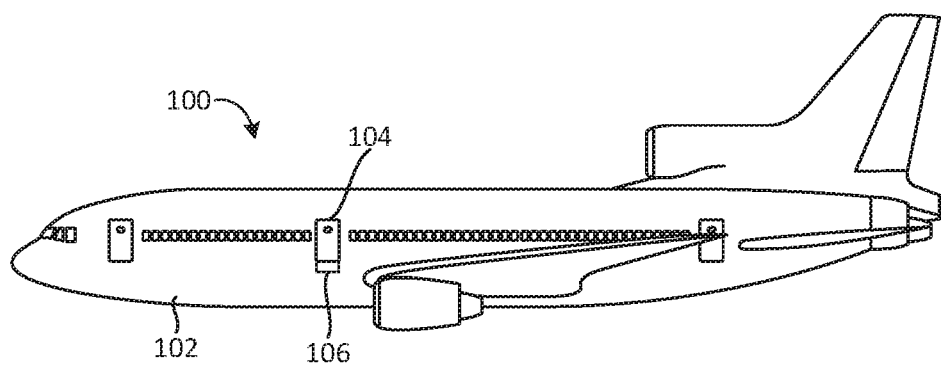
FIG. 1 illustrates a perspective view of an aircraft having an evacuation system, in accordance with various embodiments.

Referring to FIG. 1, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever.

Figure 2:
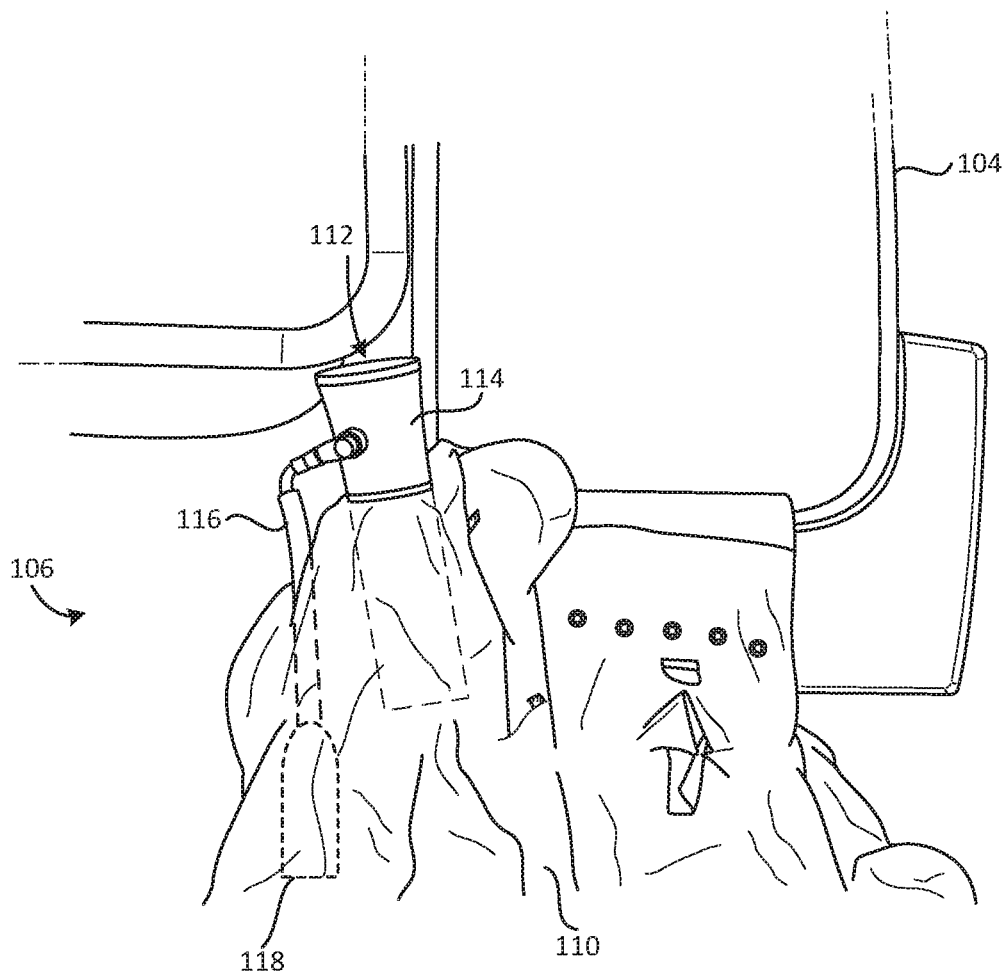
FIG. 2 illustrates an evacuation system, in accordance with various embodiments.

Referring to FIGS. 1 and 2, additional details of evacuation system 106 are illustrated, in accordance with various embodiments. In particular, evacuation system 106 includes an inflatable evacuation device 110. Evacuation system 106 further includes a source of forced gas 112. The source of forced gas 112 may cause a gas to enter the inflatable evacuation device 110 to inflate the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1.

In various embodiments, the source of forced gas 112 may include an aspirator 114 coupled to the inflatable evacuation device 110, piping 116 coupled to the aspirator 114, and a compressed fluid source 118 coupled to the piping 116. During normal flight conditions, the inflatable evacuation device 110 may be deflated and stored within a compartment of aircraft 100. In various embodiments, inflatable evacuation device 110 and aspirator 114 may be stored in a single package within the aircraft compartment. In response to deployment of the evacuation system 106, fluid may flow into aspirator 114 via piping 116 at a relatively high velocity. This fluid flow may cause aspirator 114 to draw gas from the environment. The fluid flow (such as in a gaseous state) and the environmental gas may be directed into the inflatable evacuation device 110. In response to receiving the fluid flow and the environmental gas, inflatable evacuation device 110 may begin to inflate.

Figure 3A:
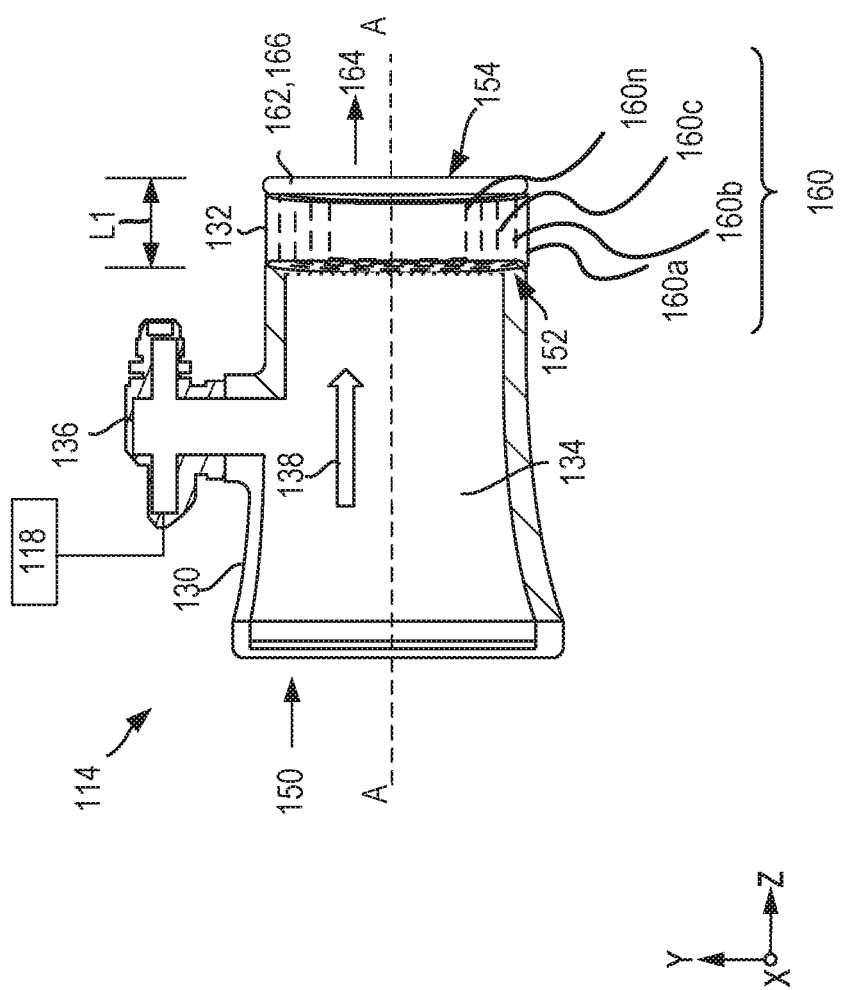
FIGS. 3A and 3B illustrate cross-sectional views of an aspirator for an inflatable evacuation device, in accordance with various embodiments.
Figure 3B:
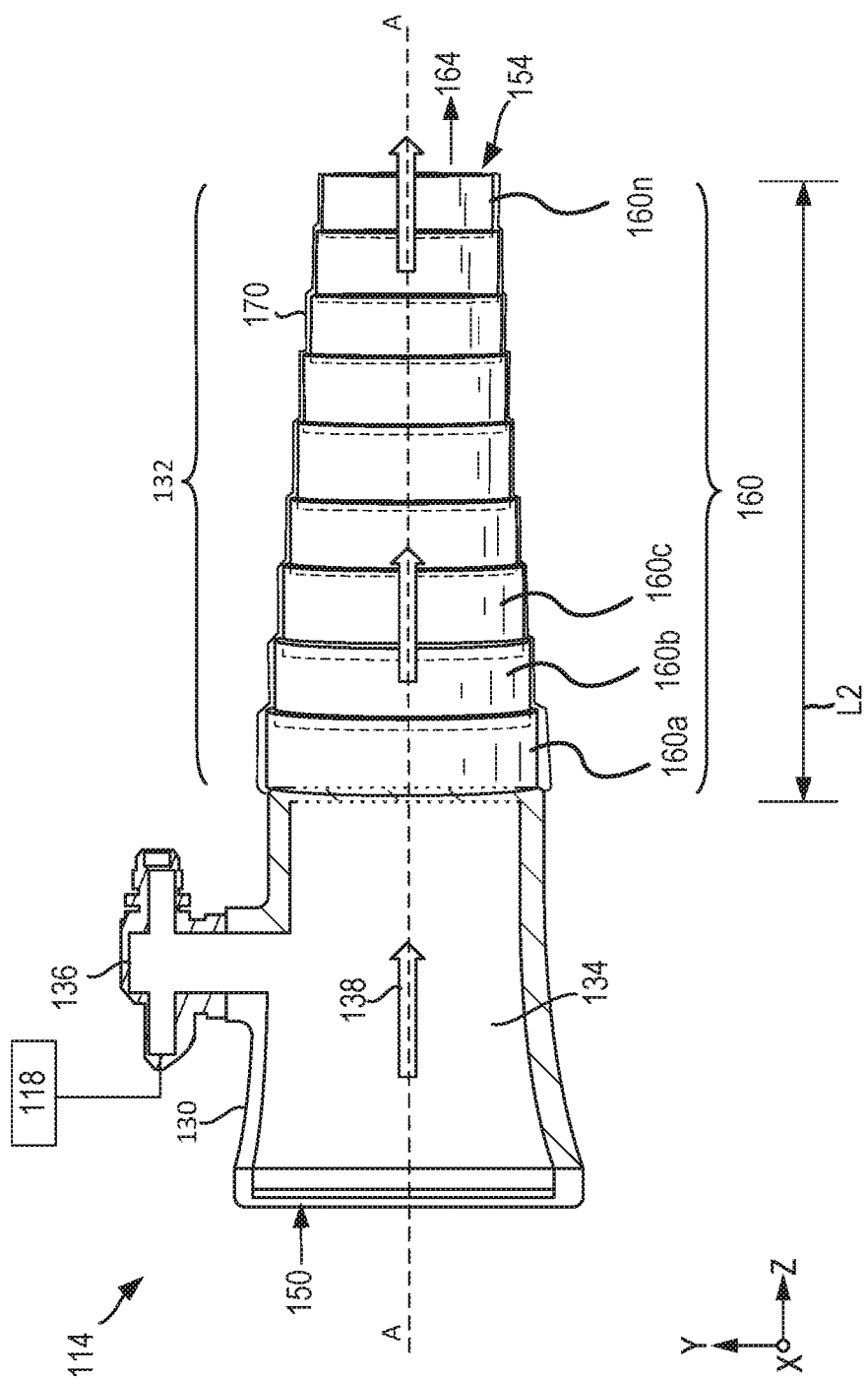

With reference to FIGS. 3A and 3B, additional details of an aspirator 114 are shown, in accordance with various embodiments. Aspirator 114 may include an aspirator body 130 coupled to an aspirator barrel 132. Aspirator barrel 132 is configured to be collapsible and extendable. Aspirator barrel 132 may be collapsed for stowing. Aspirator barrel 132 may extend during deployment of the evacuation system 106 (FIG. 2).

With reference to FIG. 3A, aspirator 114 is shown with aspirator barrel 132 in a collapsed or compressed state. In various embodiments, aspirator 114 may be packaged with the inflatable evacuation device 110 while in the compressed state. Aspirator body 130 may define an air channel 134, which may be a chamber of aspirator 114 having an airflow path 138. Aspirator 114 may include a gas valve 136 in fluid communication with air channel 134. Gas valve 136 may direct a fluid from a compressed fluid source 118 (shown schematically), such as a charged cylinder, into air channel 134. In response to high-pressure gas moving from the compressed fluid source 118 to air channel 134 via gas valve 136, gas from the environment surrounding the aspirator 114 is compelled into air channel 134 from outside the aspirator 114 due to the Venturi effect. Stated differently, aspirator 114 facilitates intake of gas from the environment, which enters air channel 134 through an intake 150. The airflow path 138 through air channel 134 is illustrated as flowing in the positive z-direction on the provided xyz axes.

As used herein, "distal" refers to the direction toward the positive z-direction on the provided xyz axes relative to aspirator 114. As used herein, "proximal" refers to a direction toward the negative z-direction on the provided xyz axes relative to aspirator 114. Aspirator barrel 132 may include a proximal end 152 coupled to the aspirator body 130 and a distal end 154, opposite to proximal end 152.

Aspirator barrel 132 may comprise a plurality of aspirator barrel segments 160 in a telescoping arrangement. Aspirator barrel segments 160 may comprise a series of nested hollow tubes, with the aspirator barrel segments 160 being collapsible and with each segment fitting within an adjacent segment. For example, a second aspirator barrel segment 160b, which may be an inner aspirator barrel segment, may be configured to fit at least partially within a first aspirator barrel segment 160a, which may be an outer aspirator barrel segment, when aspirator barrel 132 is in a stowed state. A third aspirator barrel segment 160c may be configured to fit at least partially within second aspirator barrel segment 160b when aspirator barrel 132 is in the stowed state and may be configured to interlock with second aspirator barrel segment 160b in a telescoped position when aspirator barrel 132 is in the deployed state.

Aspirator barrel 132 may further comprise a seal or cap 162 coupled to one or more aspirator barrel segments 160. In various embodiments, cap 162 is coupled to a distal aspirator barrel segment 160n. Cap 162 may cover an outlet 164 at distal end 154 of aspirator barrel 132. In response to gas flowing through the air channel 134 into aspirator barrel 132 upon deployment of the evacuation system 106 (FIG. 2)

and activation of aspirator 114, the pressure within air channel 134 increases. Cap 162 is configured to temporarily seal the outlet 164 of aspirator barrel 132. While cap 162 seals distal end 154 of aspirator barrel 132, cap 162 prevents the gas from exiting aspirator barrel 132 through outlet 164. As gas continues to enter aspirator 114 through intake 150, pressure builds within aspirator barrel 132 and causes aspirator barrel 132 to extend.

Aspirator barrel segments 160 may be configured to telescope along a longitudinal axis A-A' of aspirator body 130 in the positive z-direction. Aspirator barrel segments 160 deploy by moving along longitudinal axis A-A' away from the adjacent segments. Cap 162 may be configured to open or rupture at a predetermined pressure. The predetermined pressure may correspond to a pressure at which aspirator barrel 132 is in a partially or fully extended state. Stated differently, the pressure within aspirator barrel 132 may reach the predetermined pressure in response to aspirator barrel 132 reaching the fully extended state. In various embodiments, cap 162 may release from distal end 154 of aspirator barrel 132 in response to aspirator barrel 132 reaching the fully extended state, as shown in FIG. 3B.

In various embodiments, cap 162 may operate as a burst disk 166 or a burst disk 166 may be used in place of, or in conjunction with, a cap 162. Burst disk 166 may be designed to rupture in response to pressure within aspirator barrel 132 reaching the predetermined pressure. The predetermined pressure may correspond to a pressure at which aspirator barrel 132 is in a partially or fully extended state, and burst disk 166 may rupture in response to the pressure within aspirator barrel 132 reaching the predetermined pressure. Burst disk 166 may include any material capable of bursting in response to experiencing a predetermined amount of pressure. For example, burst disk 166 may include a plastic, a rubber, or another material, and may be relatively thin. The thickness and the material of burst disk 166 may be selected such that burst disk 166 will rupture in response to the pressure within aspirator barrel 132 reaching the predetermined pressure.

With reference to FIG. 3B, aspirator 114 is shown with aspirator barrel 132 in a deployed or extended state, in accordance with various embodiments. In response to aspirator barrel 132 reaching the fully extended state and cap 162 opening, gas may flow through aspirator barrel 132, exit through outlet 164, and flow into inflatable evacuation device 110 (FIG. 2). Distal end 154 of aspirator barrel 132 may extend into inflatable evacuation device 110 (FIG. 2). Aspirator barrel segments 160 may be interlockable by complimentary interlocking lips or rims, such as flared edges, or by a friction fit between adjacent segments. Aspirator barrel segments 160 may be self-interlocking such that aspirator barrel segments 160 form a continuous channel through aspirator barrel 132 upon being deployed to an extended position. Each aspirator barrel segment 160 may interlock with the next adjacent aspirator barrel segment 160 when aspirator barrel 132 is in the deployed state. For example, first aspirator barrel segment 160*a* may interlock with second aspirator barrel segment 160*b*. Second aspirator barrel segment 160*b* may interlock with third aspirator barrel segment 160*c*.

When aspirator barrel 132 is in the deployed state, aspirator barrel 132 has a deployed length L2. When aspirator barrel 132 is in the stowed state, aspirator barrel 132 has a stowed length L1. A stowed length L1 of aspirator barrel 132 (FIG. 3A) is less than a deployed length L2 of aspirator barrel 132 (FIG. 3B). A stowed length L1 of aspirator barrel 132 may be approximately the same length as first aspirator barrel segment 160*a*. A quantity of aspirator barrel segments 160 may be selected according to the size of each segment and according to the desired length of the aspirator barrel 132 when deployed. Aspirator barrel 132 may have a tapered shape when deployed. A diameter of distal aspirator barrel segment 160*n* is less than a diameter of first aspirator barrel segment 160*a*. The tapered shape may improve the efficiency of airflow through air channel 134 of aspirator 114.

In various embodiments, aspirator barrel 132 may further comprise a liner 170 disposed on an interior or exterior of aspirator barrel 132. Liner 170 may be coupled to one or more aspirator barrel segments 160 to form a seal between segments. For example, liner 170 may be disposed on an outer surface of first aspirator barrel segment 160*a* and may be disposed on an outer surface 182 of second aspirator barrel segment 160*b* to form a seal between first aspirator barrel segment 160*a* and second aspirator barrel segment 160*b*. Liner 170 may be disposed on an inner surface 178 of first aspirator barrel segment 160*a* and may be disposed on an inner surface 186 of second aspirator barrel segment 160*b* to form a seal between first aspirator barrel segment 160*a* and second aspirator barrel segment 160*b*. Liner 170 may be made of a flexible material, fabric or textile material, such as nylon or ballistic nylon coated in polyurethane, neoprene, plastic, polyethylene terephthalate, composite, among others. Liner 170 may fold when aspirator barrel 132 is in the collapsed state, and may unfold and/or stretch aspirator barrel 132 is in the extended state.

Figure 4:
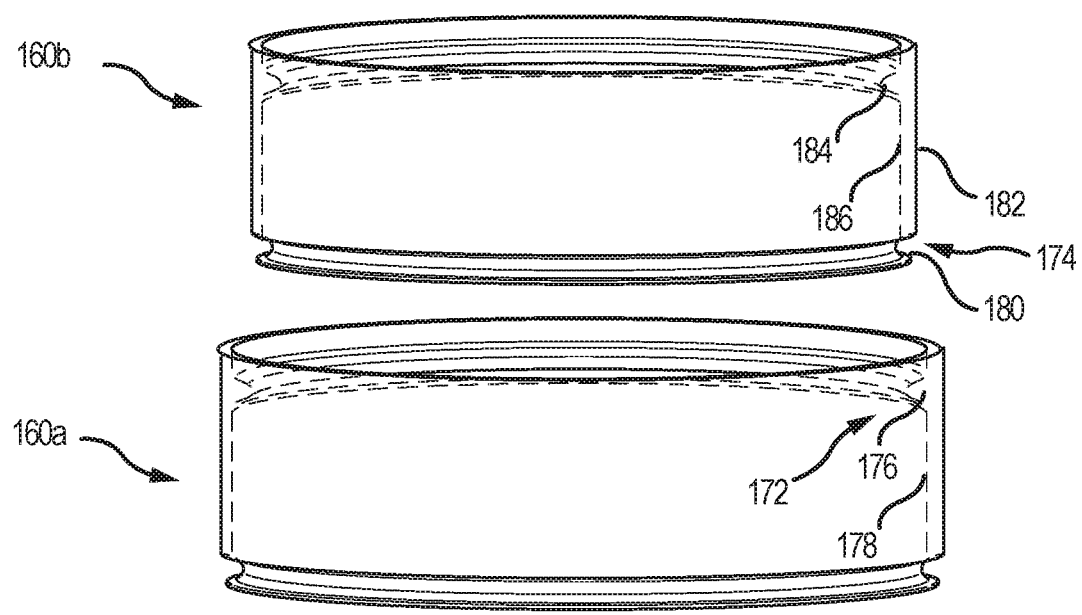
FIG. 4 illustrates a partial view of an aspirator barrel for an aspirator, in accordance with various embodiments.

With reference to FIG. 4, aspirator barrel segments of an aspirator barrel 132 are shown, in accordance with various embodiments. Aspirator barrel 132 may have a first aspirator barrel segment 160*a* and a second aspirator barrel segment 160*b*. First aspirator barrel segment 160*a* may include a first interlocking portion 172. Second aspirator barrel segment 160*b* may include a second interlocking portion 174. Second interlocking portion 174 may be configured to mate with first interlocking portion 172. The first interlocking portion 172 may comprise a protrusion 176 on inner surface 178 of first aspirator barrel segment 160*a*. Protrusion 176 may extend circumferentially along an inner surface 178 of first aspirator barrel segment 160*a* or may be a plurality of discrete protrusions. Second interlocking portion 174 may comprise a recess 180 in an outer surface 182 of the second aspirator barrel segment 160*b*. Protrusion 176 may be configured to fit within recess 180. Second aspirator barrel segment 160*b* may further include a protrusion 184 on inner surface 186 for interlocking with a recess of a third aspirator barrel segment 160*c* (see FIG. 3B).

Aspirator barrel segments 160 may have a circular cross section or other cross section geometries, such as square, I-beam, or other hollow structure, according to various embodiments. Aspirator barrel segments 160 may be comprised of a lightweight, rigid material, such as aluminum, anodized aluminum, polyamide or other plastic, composite, or other suitable material. Aspirator barrel segments 160 may be formed by additive manufacturing, injection molding, composite fabrication, forging, casting, or other suitable process. As used herein, the term "additive manufacturing" encompasses any method or process whereby a three-dimensional object is produced by creation of a substrate or addition of material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and cold spray. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, is intended to be included within the scope of the present disclosure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator, comprising:
an aspirator body defining an air channel;
an aspirator barrel comprising a first aspirator barrel segment coupled to the aspirator body, a second aspirator barrel segment, and a third aspirator barrel segment;
a first interlocking portion comprising a protrusion on an inner surface of the first aspirator barrel segment;
a second interlocking portion comprising a recess on an outer surface of the second aspirator barrel segment; and
a cap coupled to a distal end of the aspirator barrel;
wherein the second aspirator barrel segment is configured to fit at least partially within the first aspirator barrel segment when the aspirator barrel is in a stowed state and the second aspirator barrel segment is configured to interlock with the first aspirator barrel segment, via the first interlocking portion and the second interlocking portion, in an extended position when the aspirator barrel is in a deployed state;
the third aspirator barrel segment is configured to fit at least partially within the second aspirator barrel segment when the aspirator barrel is in the stowed state and the third aspirator barrel segment is configured to interlock with the second aspirator barrel segment in an extended position when the aspirator barrel is in the deployed state;
the second aspirator barrel segment extends past the first aspirator barrel segment towards the distal end when the aspirator barrel is in the deployed state, and the third aspirator barrel segment extends past the second aspirator barrel segment towards the distal end when the aspirator barrel is in the deployed state;
in the stowed state, the aspirator barrel has a first length;
in the deployed state, the aspirator barrel has a second length which is greater than the first length; and
a length of the first aspirator barrel segment is substantially equal to the first length of the aspirator barrel in the stowed state.

2. The aspirator of claim 1, wherein the aspirator barrel has a tapered shape.

3. The aspirator of claim 1, further comprising a liner coupled to the aspirator to form a seal between the first aspirator barrel segment and the second aspirator barrel segment.

4. The aspirator of claim 1, wherein a distal end of the first aspirator barrel segment is substantially flush with a distal end of the second aspirator barrel segment when the aspirator barrel is in a collapsed position.

5. The aspirator of claim 1, wherein the aspirator barrel is configured to extend in response to a pressure increase within the aspirator barrel.

6. The aspirator of claim 5, wherein the cap includes a burst disk configured to rupture in response to a pressure within the aspirator barrel reaching a predetermined pressure.

7. The aspirator of claim 6, wherein the predetermined pressure is selected such that the aspirator barrel is in a fully extended position in response to the pressure within the aspirator barrel being the predetermined pressure.

8. The aspirator of claim 1, wherein, in response to the second aspirator barrel segment moving to the extended position, the second aspirator barrel segment moves, with respect to the first aspirator barrel segment, along a longitudinal axis in a first direction towards the distal end of the aspirator barrel.

9. The aspirator of claim 8, wherein the second aspirator barrel segment extends in the first direction from the first aspirator barrel segment in the deployed state.

10. The aspirator of claim 1, wherein the protrusion is configured to fit within the recess.

11. The aspirator of claim 10, wherein the inner surface comprises at least one of an internal surface and an inner diameter surface, and the outer surface comprises at least one of an external surface and an outer diameter surface.

12. An evacuation system for use with an aircraft, comprising:
an inflatable evacuation device configured to be inflated by a compressed fluid source; and
an aspirator coupled to the compressed fluid source and to the inflatable evacuation device, the aspirator having an aspirator barrel having a first aspirator barrel segment, a second aspirator barrel segment configured to fit at least partially within the first aspirator barrel segment when the aspirator barrel is in a stowed state and configured to interlock with the first aspirator barrel segment in a telescoped position when the aspirator barrel is in a deployed state, and a third aspirator barrel segment configured to fit at least partially within the second aspirator barrel segment when the aspirator barrel is in the stowed state and configured to interlock with the second aspirator barrel segment in a telescoped position when the aspirator barrel is in the deployed state; and
a cap coupled to a distal end of the aspirator barrel;
wherein the first aspirator barrel segment comprises a first interlocking portion comprising a protrusion on an inner surface of the first aspirator barrel segment, and the second aspirator barrel segment comprises a second interlocking portion comprising a recess on an outer surface of the second aspirator barrel segment;
the second aspirator barrel segment extends past the first aspirator barrel segment towards the distal end when the aspirator barrel is in the deployed state, and the third aspirator barrel segment extends past the second aspirator barrel segment towards the distal end when the aspirator barrel is in the deployed state;
in the stowed state, the aspirator barrel has a first length;
in the deployed state, the aspirator barrel has a second length which is greater than the first length; and
a length of the first aspirator barrel segment is substantially equal to the first length of the aspirator barrel in the stowed state.

13. The evacuation system of claim 12, wherein a diameter of the second aspirator barrel segment is less than a diameter of the first aspirator barrel segment.

14. The evacuation system of claim 12, wherein the aspirator barrel is configured to extend in response to a pressure increase within the aspirator barrel.

15. The evacuation system of claim 14, wherein the distal end of the aspirator barrel extends into the inflatable evacuation device when the aspirator barrel is in a deployed state.

16. The evacuation system of claim 15, wherein the cap is configured to release in response to a pressure within the aspirator barrel reaching a predetermined pressure, and wherein the aspirator barrel directs fluid into the inflatable evacuation device.

17. An aircraft having an evacuation system, the aircraft comprising:
an inflatable evacuation device configured to pack within the aircraft; and
an aspirator configured to be packed with the inflatable evacuation device within the aircraft, the aspirator having an aspirator barrel comprising a first aspirator barrel segment, a second aspirator barrel segment, and a third aspirator barrel segment in a telescoping arrangement; and
a cap coupled to a distal end of the aspirator barrel,
wherein the aspirator barrel is configured to be stored in a collapsed position, the second aspirator barrel segment configured to fit at least partially within the first aspirator barrel segment when the aspirator barrel is in the collapsed position, and the third aspirator barrel segment configured to fit at least partially within the second aspirator barrel segment when the aspirator barrel is in the collapsed position,
wherein the first aspirator barrel segment comprises a first interlocking portion comprising a protrusion on an inner surface of the first aspirator barrel segment, and the second aspirator barrel segment comprises a second interlocking portion comprising a recess on an outer surface of the second aspirator barrel segment; and
wherein the second aspirator barrel segment extends past the first aspirator barrel segment towards the distal end when the aspirator barrel is in the deployed state, and the third aspirator barrel segment extends past the second aspirator barrel segment towards the distal end when the aspirator barrel is in the deployed state;
in the stowed state, the aspirator barrel has a first length;
in the deployed state, the aspirator barrel has a second length which is greater than the first length; and
a length of the first aspirator barrel segment is substantially equal to the first length of the aspirator barrel in the stowed state.

18. The aircraft of claim 17, wherein second aspirator barrel segment is configured to interlock with the first aspirator barrel segment in a telescoped position when the aspirator barrel is in a deployed state, and the third aspirator barrel segment is configured to interlock with the second aspirator barrel segment in a telescoped position when the aspirator barrel is in the deployed state.

19. The aircraft of claim 17, wherein the aspirator barrel is configured to extend in response to a pressure increase within the aspirator barrel.

20. The aircraft of claim 19, wherein the cap is configured to release in response to a pressure within the aspirator barrel reaching a predetermined pressure, and wherein aspirator barrel directs fluid into the inflatable evacuation device.

* * * * *